US009736151B2

(12) United States Patent
Ikeda et al.

(10) Patent No.: US 9,736,151 B2
(45) Date of Patent: Aug. 15, 2017

(54) BIOMETRIC REFERENCE INFORMATION REGISTRATION SYSTEM, APPARATUS, AND PROGRAM

(71) Applicants: Kabushiki Kaisha Toshiba, Minato-ku (JP); Toshiba Solutions Corporation, Kawasaki-shi (JP)

(72) Inventors: Tatsuro Ikeda, Fuchu (JP); Asahiko Yamada, Tokorozawa (JP); Koji Okada, Tokyo (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 126 days.

(21) Appl. No.: 14/670,038

(22) Filed: Mar. 26, 2015

(65) Prior Publication Data

US 2015/0200935 A1  Jul. 16, 2015

Related U.S. Application Data

(63) Continuation of application No. PCT/JP2012/074781, filed on Sep. 26, 2012.

(51) Int. Cl.
  *H04L 29/00* (2006.01)
  *H04L 29/06* (2006.01)
  *H04L 9/32* (2006.01)

(52) U.S. Cl.
  CPC ........ *H04L 63/0861* (2013.01); *H04L 9/3247* (2013.01); *H04L 63/0823* (2013.01);
  (Continued)

(58) Field of Classification Search
  CPC .. H04L 63/0861; H04L 9/3247; H04L 9/3231
  (Continued)

(56) References Cited

U.S. PATENT DOCUMENTS 8,260,262 B2 * 9/2012 Ben Ayed .......... G08B 13/1436
                                                    455/41.2
2002/0027494 A1   3/2002 Watanabe et al.
(Continued)

FOREIGN PATENT DOCUMENTS

CN    101383708 A    3/2009
CN    101777115 A    7/2010
(Continued)

OTHER PUBLICATIONS

Singapore Search Report and Written Opinion issued Jun. 30, 2015 in Patent Application No. 11201502281S.
(Continued)

*Primary Examiner* — Brandon Hoffman
*Assistant Examiner* — Michael D Anderson
(74) *Attorney, Agent, or Firm* — Oblon, McClelland, Maier & Neustadt, L.L.P.

(57) ABSTRACT

According to an embodiment, a biometric reference information storage apparatus transmits, to the biometric reference information certificate generation apparatus, a biometric authentication context including the challenge information, the hash value of the biometric reference information, and a first digital signature. The biometric reference information certificate generation apparatus verifies the challenge information and the first digital signature. The biometric reference information certificate generation apparatus transmits a biometric reference information certificate to the biometric reference information storage apparatus. The biometric reference information storage apparatus writes the biometric reference information and the biometric reference information certificate in a storage module.

5 Claims, 15 Drawing Sheets

(52) U.S. Cl.
CPC .......... *H04L 63/126* (2013.01); *H04L 9/3231* (2013.01); *H04L 9/3268* (2013.01)

(58) Field of Classification Search
USPC .............................................. 726/7
See application file for complete search history.

(56) References Cited

U.S. PATENT DOCUMENTS

| | | | |
|---|---|---|---|
| 2007/0124589 A1 | 5/2007 | Sutton et al. | |
| 2007/0220274 A1* | 9/2007 | Jensen | G06F 21/32 713/186 |
| 2007/0260888 A1 | 11/2007 | Giobbi et al. | |
| 2008/0065895 A1 | 3/2008 | Liu et al. | |
| 2009/0013191 A1 | 1/2009 | Popowski | |
| 2011/0047373 A1 | 2/2011 | Karasawa et al. | |
| 2012/0019379 A1 | 1/2012 | Ayed | |

FOREIGN PATENT DOCUMENTS

| | | |
|---|---|---|
| EP | 1 791 073 A1 | 5/2007 |
| EP | 1 912 151 A1 | 4/2008 |
| EP | 2 202 913 A1 | 6/2010 |
| JP | 2002-73571 A | 3/2002 |
| JP | 2005-252621 A | 9/2005 |
| JP | 2007-249629 A | 9/2007 |
| JP | 2008-59183 A | 3/2008 |
| JP | 2008-526173 A | 7/2008 |
| JP | 2009-169517 A | 7/2009 |
| JP | 4956096 B2 | 3/2012 |
| WO | WO 00/65770 A1 | 11/2000 |
| WO | WO 2009/050924 A1 | 4/2009 |

OTHER PUBLICATIONS

International Search Report issued Oct. 30, 2012 in International Application No. PCT/JP2012/074781 filed Sep. 26, 2012 (with English translation).
Written Opinion issued Oct. 30, 2012 in International Application No. PCT/JP2012/074781 filed Sep. 26, 2012.
Office Action dated Apr. 17, 2017 in Chinese Patent Application No. 201280076051.1.

* cited by examiner

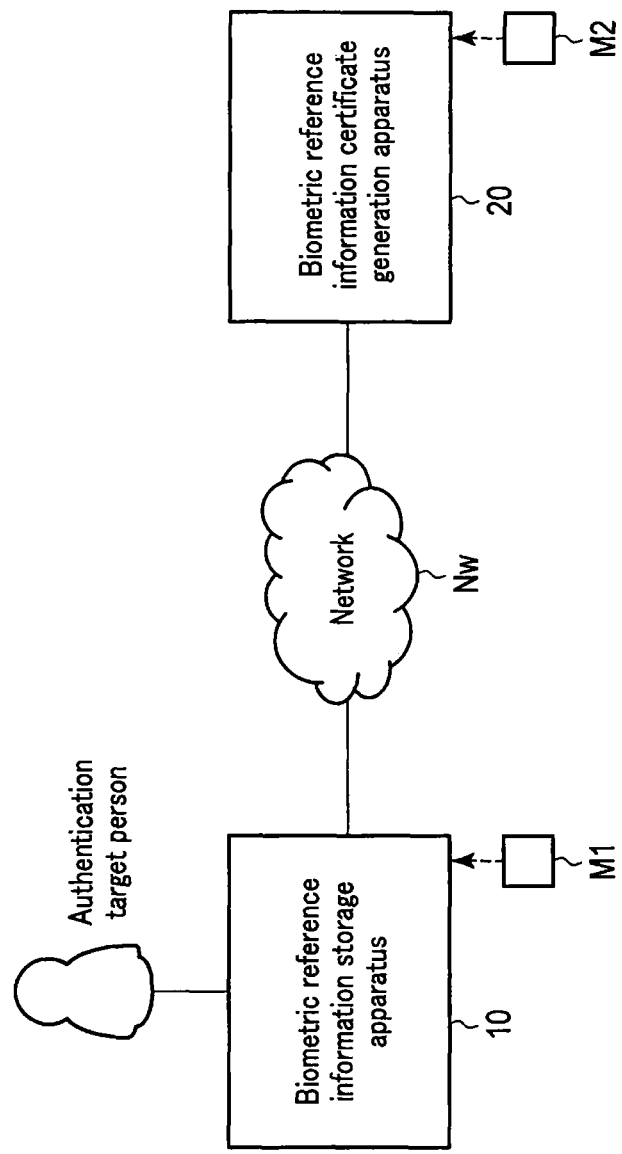
F I G. 1

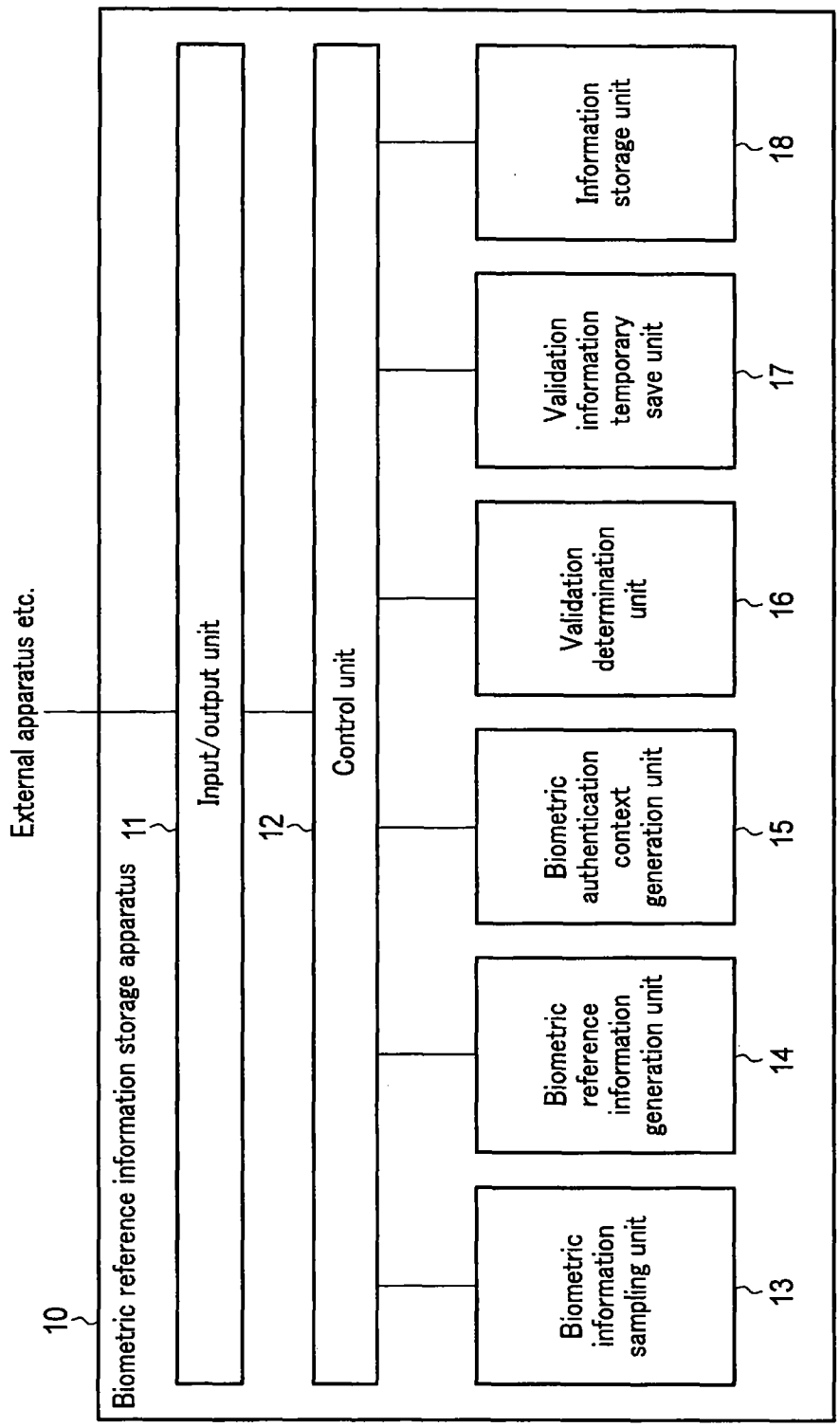
F I G. 2

| Management number | Biometric reference information | Hash value of biometric reference information | Biometric authentication context | Biometric reference information certificate |
|---|---|---|---|---|
| 1 | 1d0df2fdfe5e39fe63a··· | 98edd962d824b5835ed0 | 30800606288lc··· | 30800606288··· |
| 2 | 1276c0c90aaaefc5b681··· | 6888a8bf29fd5004073b | 30800606288lc··· | 30800606288··· |
| 3 | 6548d0547c64ddad6240··· | 5ad3f9bcab106b460513 | 30800606288lc··· | |

Validation information temporary save unit
17

F I G. 4

| Management number | Biometric reference information | Hash value of biometric reference information | Biometric authentication context | Biometric reference information certificate |
|---|---|---|---|---|
| 1 | 1d0df2fdfe5e39fe63a··· | 98edd962d824b5835ed0 | 308006062881c··· | 308006062288··· |
| 2 | 1276c0c90aaaefc5b681··· | 6888a8bf29fd50040073b | 308006062881c··· | 308006062288··· |
| 3 | 6548d0547c64ddad6240··· | 5ad3f9bcab106b460513 | 308006062881c··· | 308006062288··· |

Validation information temporary save unit

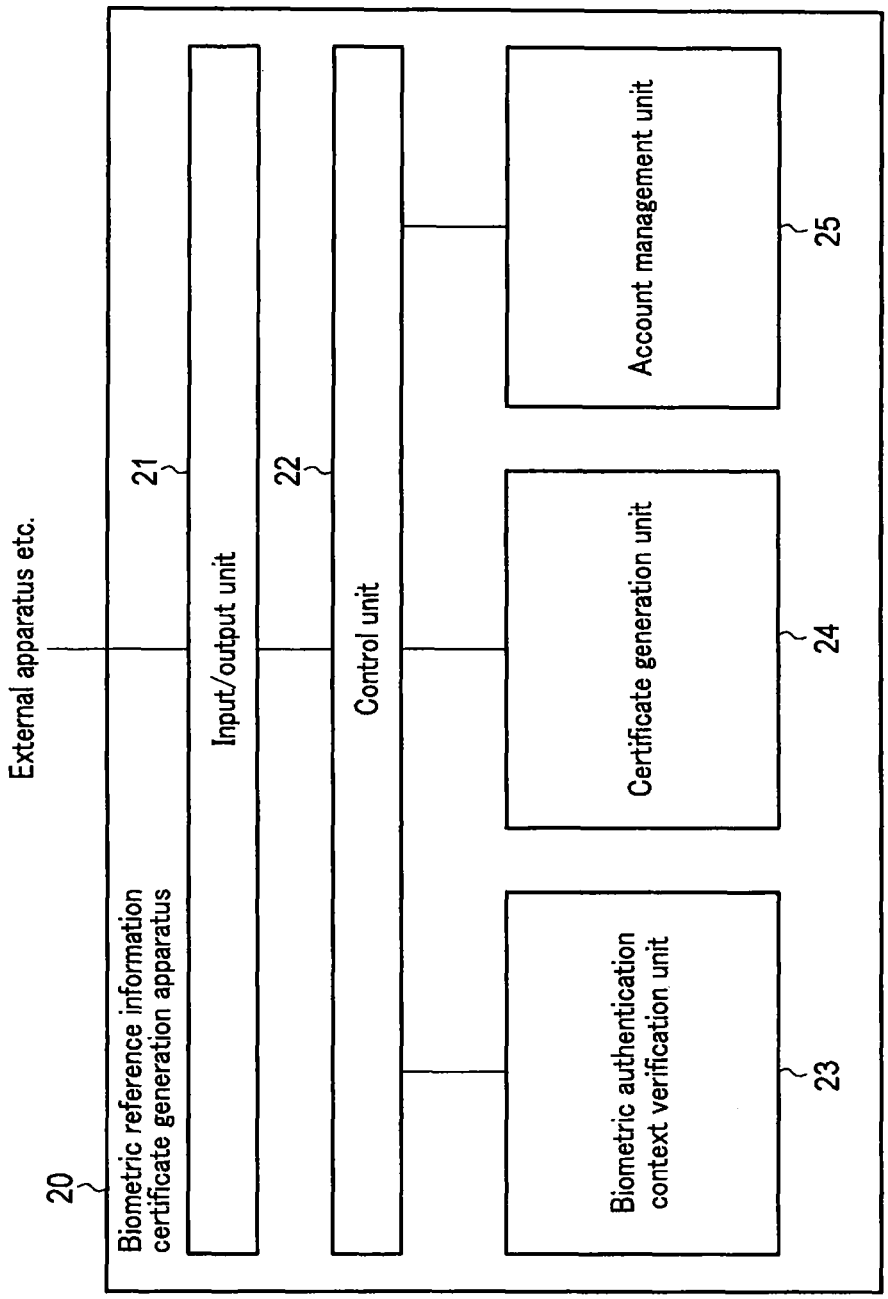
F I G. 6

| Management number | User ID | Biometric reference information certificate | Validation flag |
|---|---|---|---|
| 0001 | user1 | 30800606288··· | true |
| 0002 | user2 | 30800606288··· | true |
| 0003 | user3 | 30800606288··· | false |

Account management unit
25

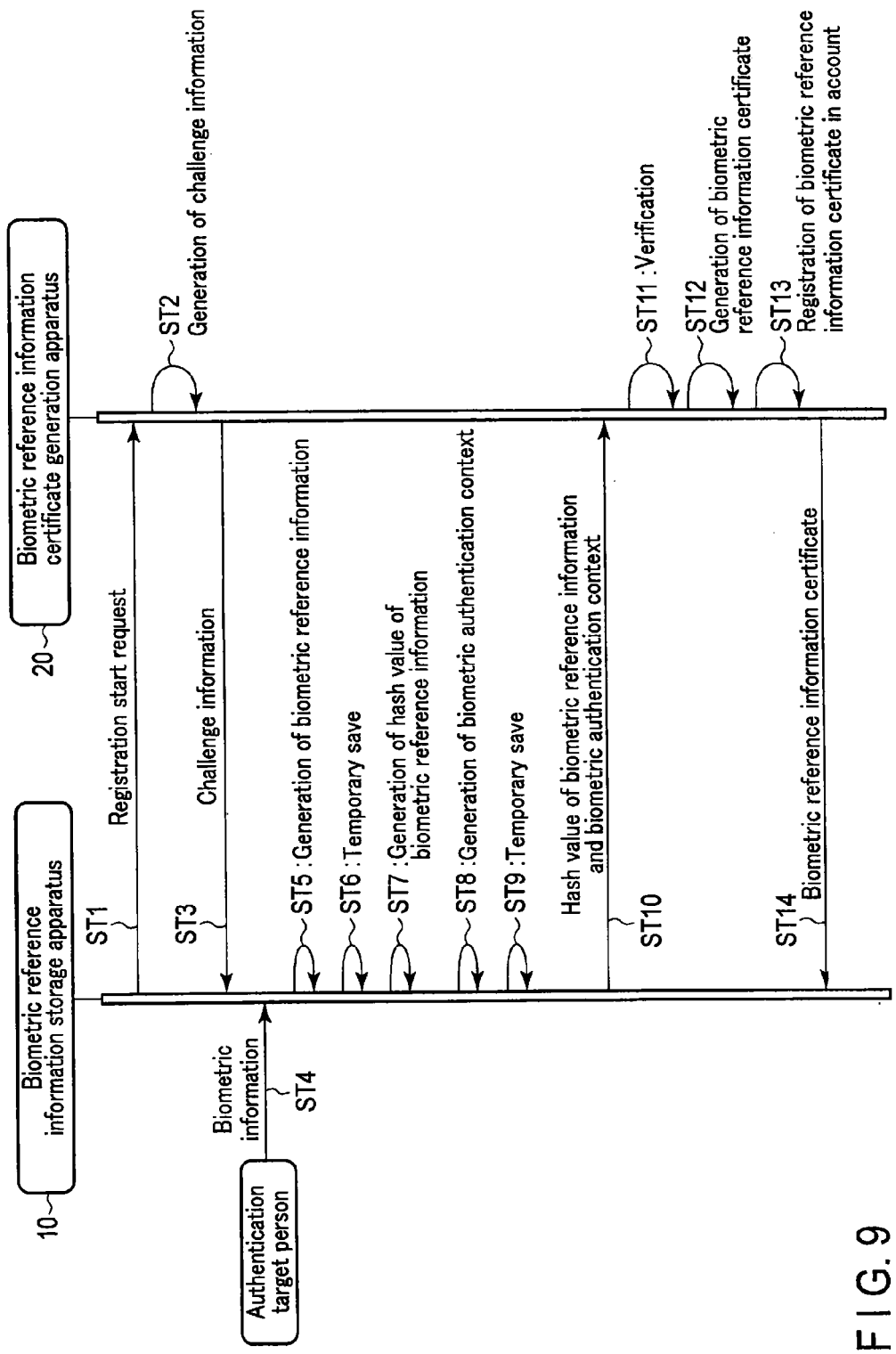
F I G. 9

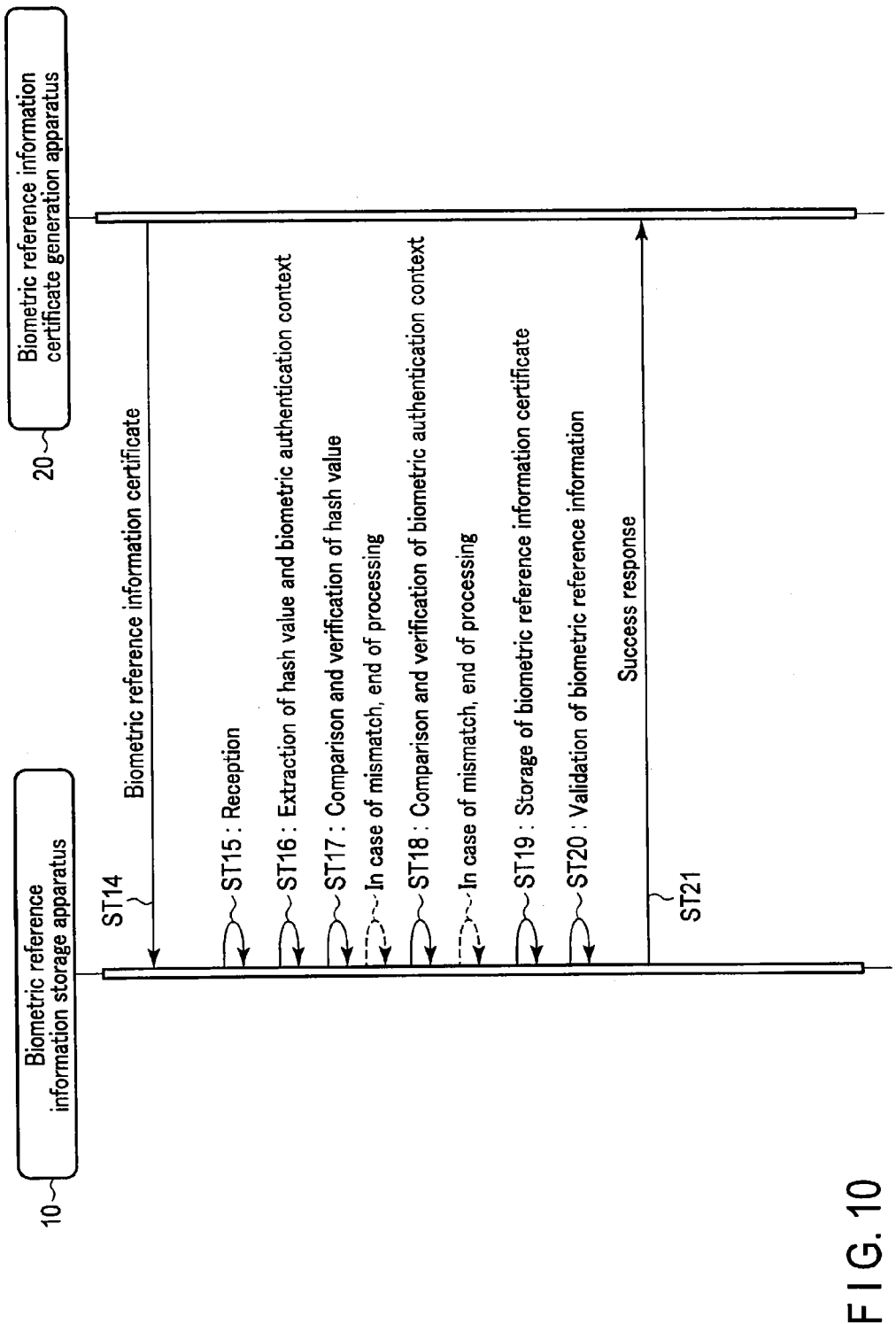
F I G. 10

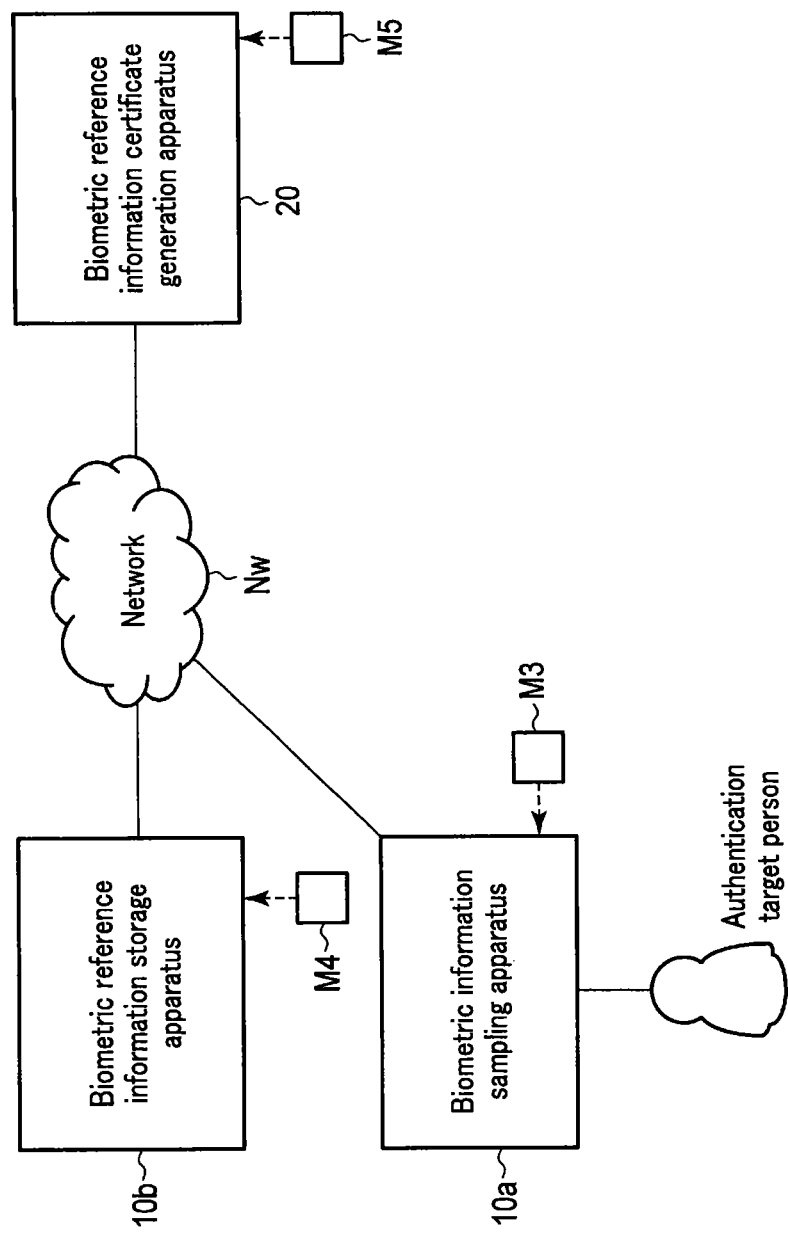
F I G. 11

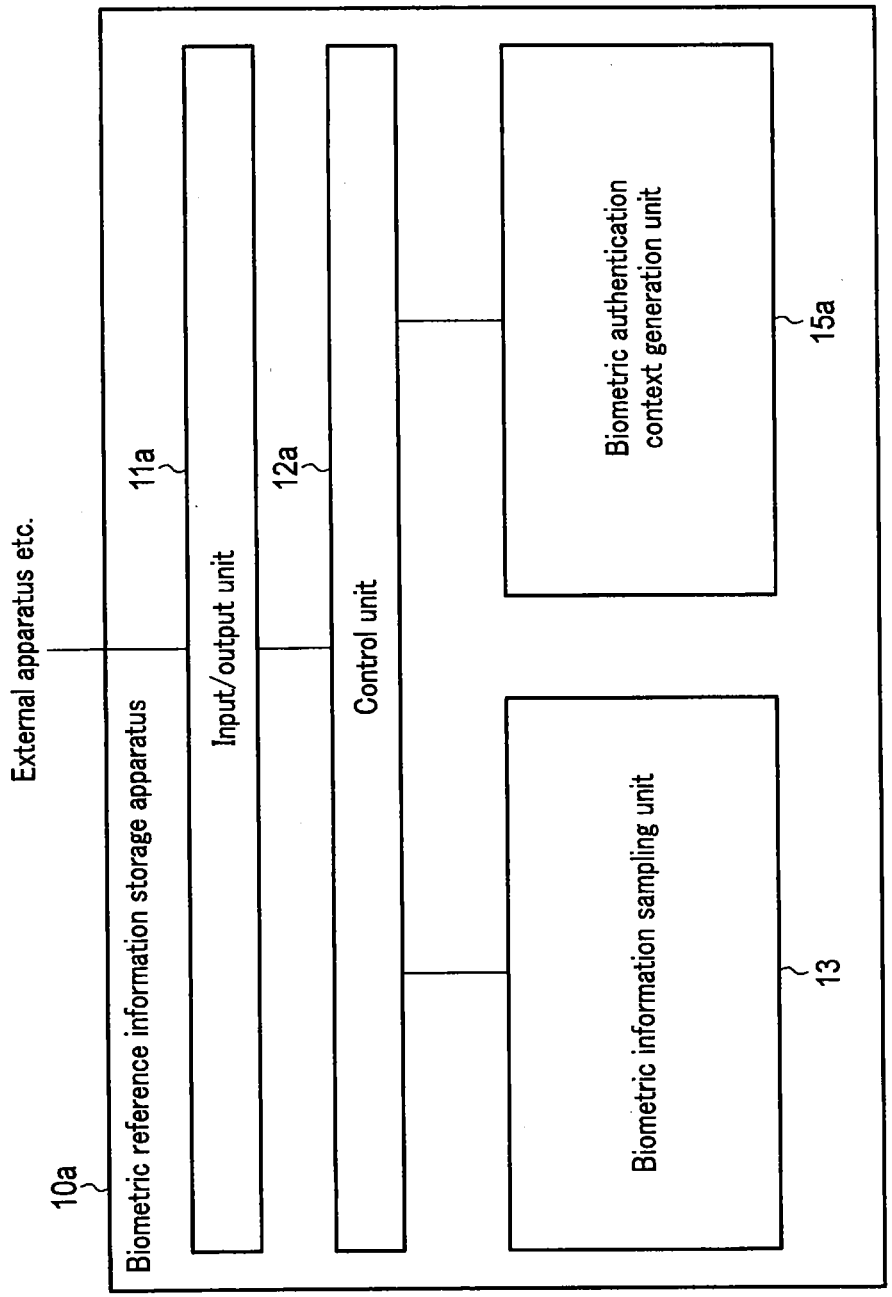
F I G. 12

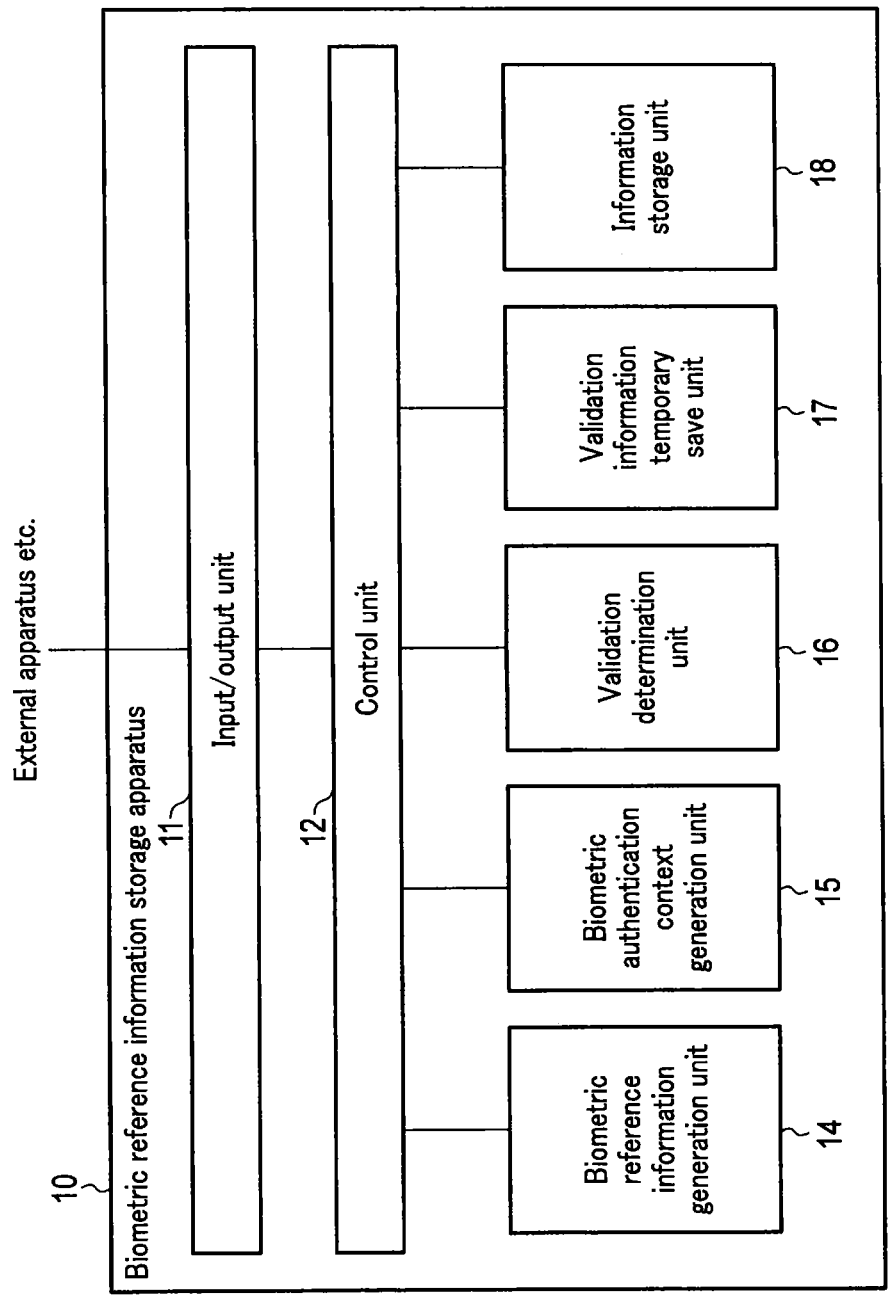
F I G. 13

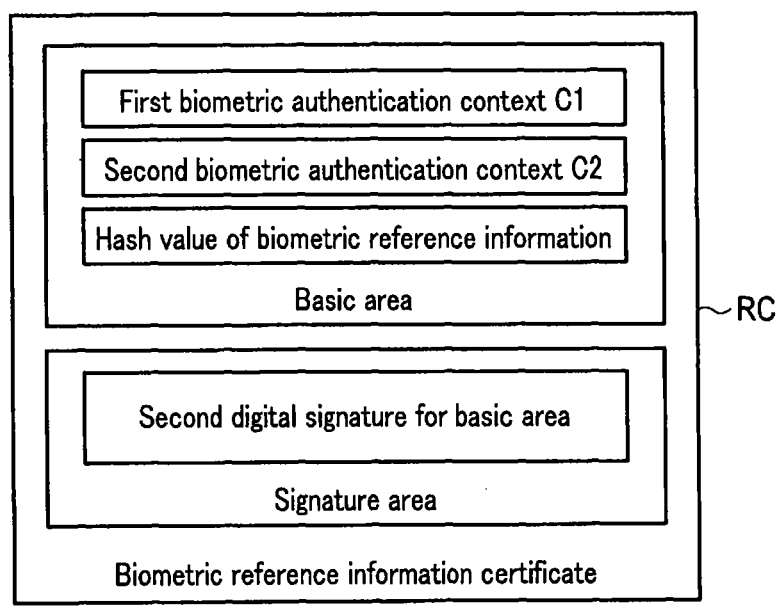
F I G. 16

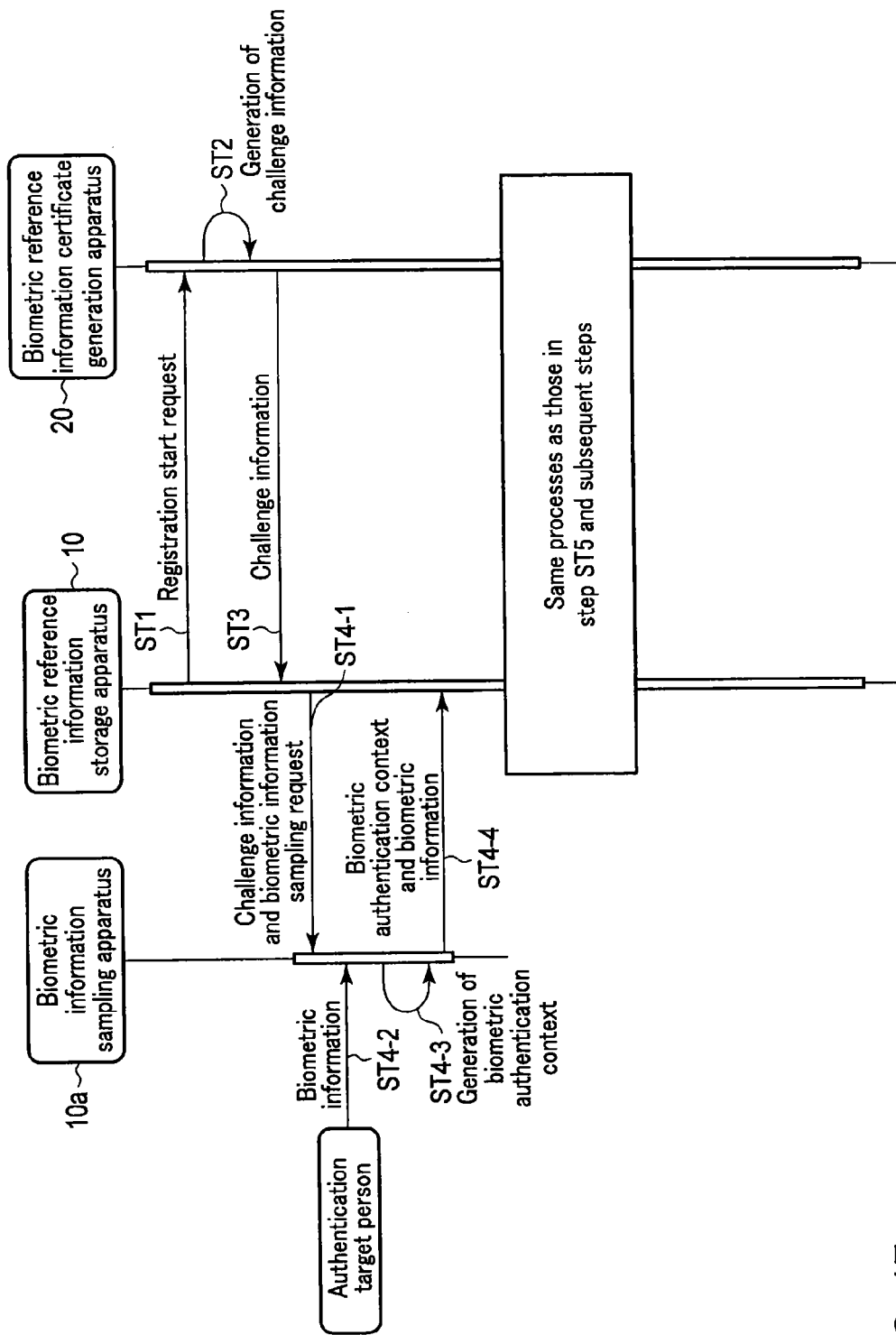
F I G. 17

BIOMETRIC REFERENCE INFORMATION REGISTRATION SYSTEM, APPARATUS, AND PROGRAM

CROSS-REFERENCE TO RELATED APPLICATIONS

This application is a Continuation application of PCT application No. PCT/JP2012/074781, filed on Sep. 26, 2012, the entire contents of which are incorporated herein by reference.

FIELD

Embodiments described herein relate generally to a biometric reference information registration system, apparatus, and program.

BACKGROUND

When implementing communication and services through a network, it is an important technical element to authenticate a communication partner. Recently, the range of authentication targets is expanding from a user to a use device terminal along with the popularization of an open network environment and the development of a federation technique for distributed services and resources.

Particularly when the authentication target is an individual, a technique of confirming the identity of the individual is receiving attention now. Generally when executing authentication, it is necessary in authentication to strictly identify or match an authentication target. At this time, when the authentication target is an individual, a principal confirmation technique of strictly confirming the identity of the individual is necessary.

At present, there is a biometric authentication technique as a promising technique of executing principal confirmation. Biometric authentication is a technique for matching the unique body feature or characteristic of each individual with biometric information (to be referred to as biometric reference information hereinafter) registered in advance, and confirming the identity of the individual. As the biometric information, the fingerprint, iris, retina, face, voice, key stroke, signature, and the like are used.

Unlike an existing authentication method based on a password or the like, biometric authentication utilizes biometric information without fear of forgetting or missing, and thus can reduce the burden on the user. Biometric information is assumed to be information that is hard to copy, and is effective as a means of prevention against spoofing of a user.

Now, open networks typified by the Internet become popular, and a move to use biometric authentication as a method of authenticating a communication partner over a network in electronic commerce and the like is growing. Even in the fields of identification and the like, it is examined to perform principal confirmation of the owner of an identification certificate by using biometric authentication.

Along with this move, a technique using an authentication context for biometric authentication is known as a technique of performing biometric authentication through a network. More specifically, for example, Japanese Patent No. 4956096 discloses a technique of summarizing process contents regarding biometric authentication on the client side into authentication context (biometric authentication context) information for biometric authentication, and notifying a verifier over a network of the information.

When biometric authentication is used on a network, there is known a method using a public key infrastructure (PKI) based on asymmetric cryptography. For example, there is known a method of associating biometric reference information (biometric reference template), which is a credential serving as the reference of the authenticity of biometric authentication, with a public key certificate. This biometric reference information indicates information obtained by performing feature extraction processing or the like on biometric raw information (biometric raw data), and serves as reference information of matching process. Some matching algorithms use biometric raw information as biometric reference information. A known typical technique is the standard specification X.509 of RFC (Request For Comments) 3739 or the like. X.509 defines that a public key certificate includes, as an option, information (hash value of biometric reference information) representing the relevance with biometric reference information. Also, ISO (International Organization for Standardization)/IEC (International Electrotechnical Commission) 24701 defines, as a BRT certificate (Biometric Reference Template certificate), data obtained by adding a digital signature to the hash value of biometric reference information.

As a combination of the above-mentioned biometric authentication and PKI, there is known a technique of indirectly executing user authentication (principal confirmation) on a network by chaining biometric authentication and entity authentication using a public key certificate.

Since base information (e.g., biometric raw information) for generating biometric reference information is sensitive information such as the body feature of an individual, the privacy needs to be taken into account. Hence, it is conceivable to execute biometric authentication processing itself on the authentication target person side without saving information such as biometric reference information on the authenticator side. This method can indirectly execute lifecycle management of biometric reference information by associating a public key certificate and biometric reference information as described above.

However, the above-mentioned biometric authentication techniques have a disadvantage in which biometric reference information cannot be registered in a biometric authentication system from an arbitrary client environment through a network.

For example, biometric reference information is created regardless of which of the authentication target person side and the verifier side manages biometric reference information to be registered. In either case, it is necessary that an authentication target person visits a store or the like designated by a verifier, and biometric raw information is sampled by a device (e.g., biometric information scanner) prepared by the verifier side. This is because the quality and security of the client environment need to be maintained at a predetermined level. That is, in order to prevent registration of low-quality biometric reference information and maintain the matching accuracy at a predetermined level, biometric information needs to be sampled in a client environment prepared by the verifier side. However, an authentication target person is disadvantageously forced to physically move, increasing the burden on the authentication target person.

To solve this disadvantage, Jpn. Pat. Appln. KOKAI Publication No. 2009-169517 discloses a technique for registering biometric reference information from an arbitrary client environment through a network while maintaining the matching accuracy at a predetermined level.

However, in the technique disclosed in Jpn. Pat. Appln. KOKAI Publication No. 2009-169517, the study of the present inventor reveals that secret information needs to be shared in advance between a device (e.g., portable medium) that stores biometric reference information, and a biometric authentication system. It is presumed that the biometric reference information is managed by a device closely associated with the biometric authentication system.

More specifically, a specific biometric authentication system is presumed to manage a device capable of registering only biometric reference information (and/or information that guarantees the biometric reference information) issued by the biometric authentication system. In this management, the user needs to hold a corresponding device for each biometric authentication system, increasing the burden.

It is an object of the present invention to provide a biometric reference information registration system, apparatus, and program capable of guaranteeing and storing biometric reference information through a network without sharing secret information in advance between a device and a biometric authentication system.

BRIEF DESCRIPTION OF THE DRAWINGS

FIG. 1 is a schematic view showing an example of the arrangement of a biometric reference information registration system according to the first embodiment.

FIG. 2 is a schematic view showing an example of the arrangement of a biometric reference information storage apparatus according to the first embodiment.

FIG. 4 is a schematic view for explaining a validation information temporary save unit according to the first embodiment.

FIG. 5 is a schematic view for explaining the validation information temporary save unit according to the first embodiment.

FIG. 6 is a schematic view showing an example of the arrangement of a biometric reference information certificate generation apparatus according to the first embodiment.

FIG. 9 is a sequence chart for explaining an operation according to the first embodiment.

FIG. 10 is a sequence chart for explaining an operation according to the first embodiment.

FIG. 11 is a schematic view showing an example of the arrangement of a biometric reference information registration system according to the second embodiment.

FIG. 12 is a schematic view showing an example of the arrangement of a biometric information sampling apparatus according to the second embodiment.

FIG. 13 is a schematic view showing an example of the arrangement of a biometric reference information storage apparatus according to the second embodiment.

FIG. 16 is a schematic view showing an example of the structure of a biometric reference information certificate according to the second embodiment.

FIG. 17 is a sequence chart for explaining an operation according to the second embodiment.

DETAILED DESCRIPTION

Figure 3:
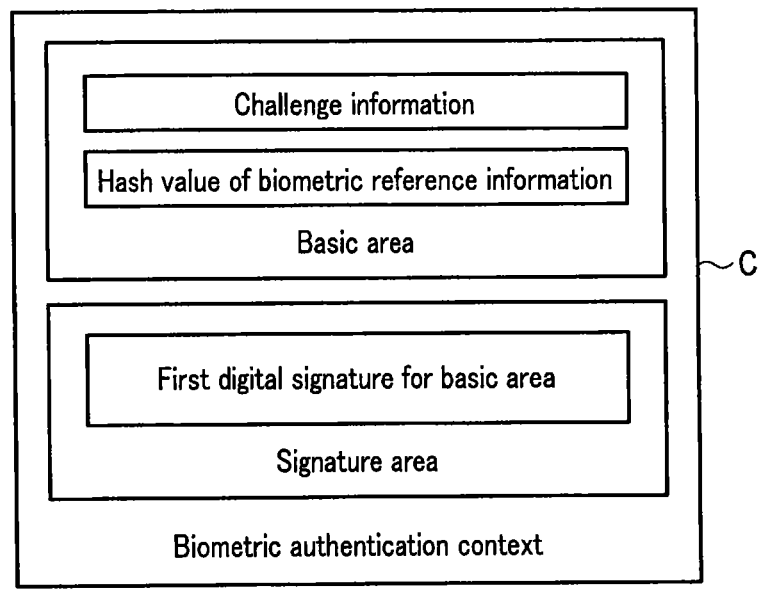
FIG. 3 is a schematic view showing an example of the structure of a biometric authentication context according to the first embodiment.

In general, according to one embodiment, a biometric reference information registration system comprises a biometric reference information storage apparatus and biometric reference information certificate generation apparatus configured to communicate with each other through a network. The biometric reference information registration system registers biometric reference information of an authentication target person in the biometric reference information storage apparatus.

The biometric reference information storage apparatus includes a first private key storage module, a challenge information reception module, a biometric reference information generation module, a hash value generation module, a first signature generation module, a biometric authentication context generation module, a biometric authentication context transmission module, a certificate reception module, a first extraction module, a hash value verification module, a biometric authentication context verification module, a storage module, and a write module.

The first private key storage module stores a first private key of the apparatus.

The challenge information reception module receives challenge information from the biometric reference information certificate generation apparatus.

The biometric reference information generation module generates biometric reference information based on biometric information sampled from the authentication target person.

The hash value generation module generates a hash value of the biometric reference information.

The first signature generation module generates a first digital signature based on the first private key for the challenge information and the hash value of the biometric reference information.

The biometric authentication context generation module generates a biometric authentication context including the challenge information, the hash value of the biometric reference information, and the first digital signature.

The biometric authentication context transmission module transmits the hash value of the biometric reference information and the biometric authentication context to the biometric reference information certificate generation apparatus.

The certificate reception module receives, from the biometric reference information certificate generation apparatus, a biometric reference information certificate including the hash value of the biometric reference information, the biometric authentication context, and a second digital signature for the hash value of the biometric reference information and the biometric authentication context.

The first extraction module extracts the hash value of the biometric reference information and the biometric authentication context from the biometric reference information certificate.

The hash value verification module verifies the extracted hash value based on the generated hash value.

The biometric authentication context verification module verifies the extracted biometric authentication context based on the generated biometric authentication context.

The storage module is a module configured to store the biometric reference information and the biometric reference information certificate.

When respective results of the verifications by the hash value verification module and the biometric authentication context verification module represent validity, the write module writes the biometric reference information and the biometric reference information certificate in the storage module.

The biometric reference information certificate generation apparatus includes an account storage module, a second private key storage module, a challenge information transmission module, a biometric authentication context reception module, a second extraction module, a challenge information verification module, a signature verification module, a second signature generation module, a certificate generation module, a certificate write module, and a certificate transmission module.

The account storage module stores a user ID of the authentication target person and the biometric reference information certificate in association with each other.

The second private key storage module stores a second private key of the apparatus.

The challenge information transmission module generates the challenge information and transmits the challenge information to the biometric reference information storage apparatus.

The biometric authentication context reception module receives the hash value of the biometric reference information and the biometric authentication context from the biometric reference information storage apparatus.

The second extraction module extracts challenge information from the received biometric authentication context.

The challenge information verification module verifies the extracted challenge information based on the transmitted challenge information.

The signature verification module verifies a first digital signature in the received biometric authentication context based on a first public key corresponding to the first private key.

When respective results of the verifications by the challenge information verification module and the signature verification module represent validity, the second signature generation module generates the second digital signature based on the second private key for the hash value of the biometric reference information and the biometric authentication context that have been received.

The certificate generation module generates the biometric reference information certificate including the hash value of the biometric reference information, the biometric authentication context, and the second digital signature.

The certificate write module writes the generated biometric reference information certificate in the account storage module in association with the user ID of the authentication target person.

The certificate transmission module transmits the generated biometric reference information certificate to the biometric reference information storage apparatus.

An embodiment will now be described with reference to the accompanying drawings. Note that each of the following apparatuses can be implemented by either a hardware arrangement, or a combinational arrangement of a hardware resource and software. The software in the combinational arrangement includes programs that are installed in a computer from a network or non-transitory computer-readable storage media M1 to M5, executed by the processor of the computer, and cause the computer to implement the functions of each apparatus, as shown in FIGS. 1 and 11.

First Embodiment

FIG. 1 is a schematic view showing an example of the arrangement of a biometric reference information registration system according to the first embodiment. The biometric reference information registration system includes a biometric reference information storage apparatus 10 and biometric reference information certificate generation apparatus 20 that can communicate with each other through a network Nw. The biometric reference information storage apparatus 10 and the biometric reference information certificate generation apparatus 20 are connected in an arbitrary connection form. The biometric reference information registration system registers biometric reference information of an authentication target person in the biometric reference information storage apparatus 10. Note that the biometric reference information registration system can be rewritten into a biometric reference information storage system. Also, the term "registration" may be properly rewritten into "storage" or the like.

As shown in FIG. 2, the biometric reference information storage apparatus 10 includes an input/output unit 11, a control unit 12, a biometric information sampling unit 13, a biometric reference information generation unit 14, a biometric authentication context generation unit 15, a validation determination unit 16, a validation information temporary save unit 17, and an information storage unit 18. The biometric reference information storage apparatus 10 is desirably a device having tamper resistance and computational ability, such as an IC (Integrated Circuit) card or a cell phone.

The input/output unit 11 is a functional unit that executes specific processing on the biometric reference information storage apparatus 10 and inputs/outputs data in accordance with an external command, like a CUI (Command User Interface) or GUI (Graphical User Interface). Data input/output (transmitted/received) to/from the input/output unit 11 include, e.g., a user ID, a password, a registration start request, challenge information, the hash value of biometric reference information, a biometric authentication context, and a biometric reference information certificate.

The control unit 12 is a functional unit for controlling the overall processing in the biometric reference information storage apparatus 10. The control unit 12 controls events and data in the biometric reference information storage apparatus 10. The control unit 12 executes a command to each functional unit of the biometric reference information storage apparatus 10, and transfers data necessary for processing. Note that this function may be omitted, and a direct call may be performed between other functional units.

The biometric information sampling unit 13 is a function for sampling biometric information of an authentication target person.

The biometric reference information generation unit 14 is a functional unit for generating biometric reference information based on biometric information sampled by the biometric information sampling unit 13.

The biometric authentication context generation unit 15 is a functional unit for generating a biometric authentication context for guaranteeing processing regarding biometric authentication executed by the biometric reference information storage apparatus 10. In this embodiment, the biometric reference information generation unit 14 and the information storage unit 18 are guarantee targets. A preferable example of the biometric authentication context is a biometric authentication context in the ISO/IEC 24761 format. In this embodiment, the biometric authentication context is associated with biometric reference information. For example, when a biometric authentication context C has the ISO/IEC 24761 format, it includes the hash value of biometric reference information, as shown in FIG. 3.

The biometric authentication context generation unit 15 has, for example, the following functions (f15-1) to (f15-4).

(f15-1) A first private key storage function of storing the first private key of the apparatus. Note that the first private key storage function includes, e.g., a storage area for storing the first private key, and a function of writing the first private key in the storage area.

(f15-2) A hash value generation function of generating the hash value of biometric reference information. The hash value has a fixed data length depending on the hash algorithm.

(f15-3) A first signature generation function of generating the first digital signature based on the first private key for challenge information and the hash value of biometric reference information.

(f15-4) A biometric authentication context generation function of generating the biometric authentication context C including the challenge information, the hash value of biometric reference information, and the first digital signature.

The validation determination unit 16 is a functional unit for validating biometric reference information and a biometric reference information certificate RC. The validation determination unit 16 determines validation of biometric reference information and the biometric reference information certificate RC by verifying biometric reference information and a biometric authentication context that are saved in the validation information temporary save unit 17, and a biometric reference information certificate acquired from the biometric reference information certificate generation apparatus 20. If the validation determination unit 16 determines that the biometric reference information and the biometric reference information certificate RC are valid, it stores them in the information storage unit 18 and validates them.

The validation determination unit 16 has, for example, the following functions (f16-1) to (f16-4).

(f16-1) A first extraction function of extracting the hash value of biometric reference information and the biometric authentication context C from the biometric reference information certificate RC.

(f16-2) A hash value verification function of verifying an extracted hash value based on a generated hash value.

(f16-3) A biometric authentication context verification function of verifying an extracted biometric authentication context based on a generated biometric authentication context.

(f16-4) A write function of, when the results of verifications by the hash value verification function (f16-2) and the biometric authentication context verification function (f16-3) represent validity, writing the biometric reference information and the biometric reference information certificate in the information storage unit 18.

The validation information temporary save unit 17 is a functional unit for temporarily saving biometric reference information generated by the biometric reference information generation unit 14 and a biometric authentication context generated by the biometric authentication context generation unit 15. The validation determination unit 16 uses the saved information for validation determination of the biometric reference information and the biometric reference information certificate RC. The function implemented by the validation information temporary save unit 17 may be arranged as the function of the information storage unit 18.

For example, as shown in FIGS. 4 and 5, the validation information temporary save unit 17 can save a management number, biometric reference information, the hash value of the biometric reference information, a biometric authentication context, and a biometric reference information certificate in association with each other. Note that the management number may be omitted properly. The validation information temporary save unit 17 can be implemented as, e.g., a storage area for storing a data table that describes biometric reference information, the hash value of the biometric reference information, a biometric authentication context, and the biometric reference information certificate RC in association with each other. In the example shown in FIG. 4, valid biometric reference information certificates are saved in association with each other, as represented by lines of management numbers 1 and 2. An invalid biometric reference information certificate is not saved, as represented by a line of management number 3. Note that the management number may be omitted properly. In this example, each of biometric reference information, the hash value of the biometric reference information, a biometric authentication context, and a biometric reference information certificate is described as binary data of a two-digit hexadecimal character string. In FIGS. 4 and 5, the biometric authentication context and the biometric reference information certificate seem to be the same data, but subsequent data, the illustration of which is omitted, are different (leading data become the same because the data format is determined).

The information storage unit 18 is a functional unit for storing biometric reference information and the biometric reference information certificate RC. The biometric reference information certificate RC is information that is generated by the biometric reference information certificate generation apparatus 20 and guarantees biometric reference information. A preferable example of the biometric reference information certificate RC is a BRT certificate defined by ISO/IEC 24761. This embodiment will explain an example using the BRT certificate as a concrete biometric reference information certificate.

As shown in FIG. 6, the biometric reference information certificate generation apparatus 20 includes an input/output unit 21, a control unit 22, a biometric authentication context verification unit 23, a certificate generation unit 24, and an account management unit 25.

The input/output unit 21 is a functional unit similar to the input/output unit 11 of the biometric reference information storage apparatus 10, and is a functional unit that executes specific processing on the biometric reference information certificate generation apparatus 20 and inputs/outputs data. Data input/output (transmitted/received) to/from the input/output unit 21 include, e.g., a user ID, a password, a registration start request, challenge information, the hash value of biometric reference information, a biometric authentication context, and a biometric reference information certificate.

The control unit 22 is a functional unit similar to the control unit 12 of the biometric reference information storage apparatus 10, and is a functional unit for controlling the overall processing in the biometric reference information certificate generation apparatus 20. The control unit 22 controls events and data in the biometric reference information certificate generation apparatus 20.

The biometric authentication context verification unit 23 is a functional unit for verifying the biometric authentication context C obtained by an interaction with the biometric reference information storage apparatus 10. When the biometric authentication context C has the ISO/IEC 24761 format, the biometric authentication context verification unit 23 transmits, to the biometric reference information storage apparatus 10, challenge information (random value) for challenge & response authentication based on the public key cryptography or MAC (Message Authentication Code), verifies the validity of the digital signature value or MAC value of the biometric authentication context C obtained from the biometric reference information storage apparatus 10, and verifies the contents of biometric processing described in the biometric authentication context C.

The biometric authentication context verification unit 23 has, for example, the following functions (f23-1) to (f23-4).

(f23-1) A challenge information transmission function of generating challenge information and transmitting the challenge information to the biometric reference information storage apparatus 10.

(f23-2) A second extraction function of extracting challenge information from the received biometric authentication context C.

(f23-3) A challenge information verification function of verifying extracted challenge information based on transmitted challenge information. The challenge information verification function compares, for example, two pieces of challenge information, and when they match each other, obtains a verification result representing validity.

(f23-4) A signature verification function of verifying, based on the first public key corresponding to the first private key, the first digital signature in a received biometric authentication context.

Figures 7, 8:
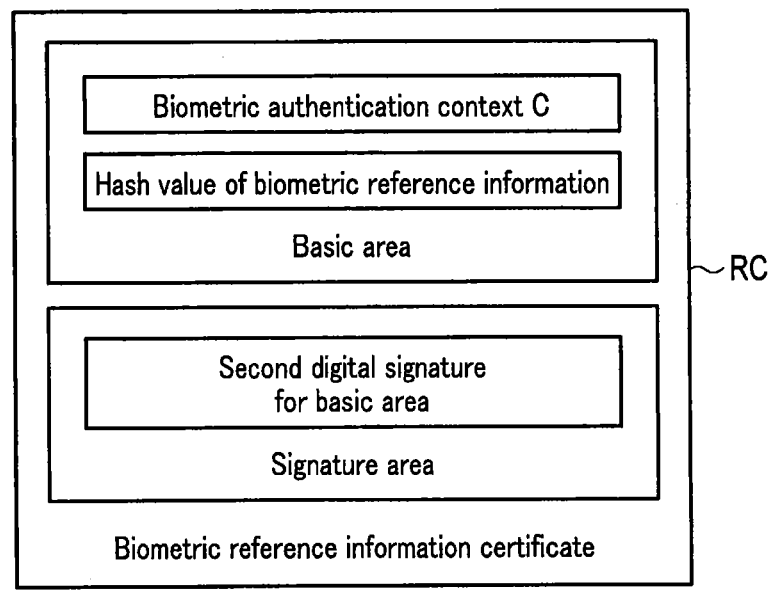
FIG. 7 is a schematic view showing an example of the structure of a biometric reference information certificate according to the first embodiment.
FIG. 8 is a schematic view for explaining an account management unit according to the first embodiment.

As shown in FIG. 7, the certificate generation unit 24 is a functional unit for generating the biometric reference information certificate RC including the hash value of biometric reference information and the biometric authentication context C that are transmitted from the biometric reference information storage apparatus 10, as shown in FIG. 7.

The certificate generation unit 24 has, for example, the following functions (f24-1) to (f24-3).

(f24-1) A second private key storage function of storing the second private key of the apparatus. Note that the second private key storage function includes, e.g., a storage area for storing the second private key, and a function of writing the second private key in the storage area.

(f24-2) A second signature generation function of, when the respective results of verifications by the challenge information verification function (f23-3) and the signature verification function (f23-4) represent validity, generating a second digital signature based on the second private key for the hash value of biometric reference information and the biometric authentication context C that have been received.

(f24-3) A certificate generation function of generating the biometric reference information certificate RC including the hash value of biometric reference information, the biometric authentication context, and the second digital signature.

The account management unit 25 is a functional unit for specifying the account of an authentication target person, and storing the generated biometric reference information certificate RC as the attribute value of the account of the authentication target person. The account management unit 25 can save, e.g., a management number, a user ID, a biometric reference information certificate, and a validation flag in association with each other, as shown in FIG. 8. Note that the management number and the validation flag may be omitted properly.

More specifically, the account management unit 25 has, for example, the following functions (f25-1) and (f25-2).

(f25-1) An account storage function for storing the user ID of an authentication target person and the biometric reference information certificate RC in association with each other. The account storage function can be implemented as a storage area for storing an account data table that describes a user ID and the biometric reference information certificate RC in association with each other. The account storage function may include a function of writing a user ID in advance in the account data table. Note that, for example, the control unit 22 may have the function of writing a user ID in advance in the account data table.

(f25-2) A certificate write function of writing a generated biometric reference information certificate in the account storage function in association with the user ID of an authentication target person.

The account management unit 25 may be closed in the biometric reference information certificate generation apparatus 20, or may federate with an arbitrary ID management (IDentify management) system. A module configured to specify the account of an authentication target person is out of the scope of each embodiment, and an arbitrary module such as conventional authentication based on a user ID/password may be adopted.

Next, the operation of the biometric reference information registration apparatus having the above-described arrangement will be explained with reference to the sequence charts of FIGS. 9 and 10.

As shown in FIG. 9, the biometric reference information storage apparatus 10 transmits a registration start request to the biometric reference information certificate generation apparatus 20 in response to, e.g., an operation to the input/output unit by an authentication target person (ST1). Note that, instead of the biometric reference information storage apparatus 10, the biometric reference information certificate generation apparatus 20 may transmit a registration processing start request to the biometric reference information storage apparatus 10. Specifying of an authentication target person is premised to be executed before step ST1 or in response to a registration start request in step ST1. To specify an authentication target person includes, for example, processing of writing the user ID of an authentication target person in advance in the account management unit 25, and processing of acquiring the first public key of the biometric reference information storage apparatus 10 for the authentication target person by the biometric authentication context verification unit 23. Note that the processing of acquiring the first public key is not limited to this timing, and suffices to be executed till verification processing of the first digital signature in step ST11.

First, upon receiving the registration start request in ST1, the biometric reference information certificate generation apparatus 20 generates challenge information (random value) necessary to generate the biometric authentication context C by the biometric authentication context verification unit 23 (ST2), and notifies the biometric reference information storage apparatus 10 of the challenge information (ST3). The information necessary to generate the biometric authentication context C is not limited to the challenge information, and suffices to be exchanged in steps ST1 to ST3.

Upon receiving the challenge information, the biometric reference information storage apparatus 10 controls the biometric information sampling unit 13 to sample biometric information of the authentication target person (ST4).

The biometric reference information generation unit 14 generates biometric reference information from the biometric information sampled in step ST4 (ST5), and temporarily saves the biometric reference information in the validation information temporary save unit 17 (ST6).

The biometric authentication context generation unit 15 generates the hash value of the biometric reference information generated in step ST5 (ST7), and temporarily saves the hash value in the validation information temporary save unit 17. Note that the hash value can be generated from biometric reference information in the validation information temporary save unit 17 and thus may not be saved.

The biometric authentication context generation unit 15 generates the first digital signature based on the first private key of the apparatus 10 for the challenge information notified in step ST3 and the hash value of the biometric reference information generated in step ST7. After that, the biometric authentication context generation unit 15 generates the biometric authentication context C including the challenge information, the hash value of the biometric reference information, and the first digital signature (ST8), and temporarily saves the biometric authentication context C in the validation information temporary save unit 17 (ST9).

Then, the biometric reference information storage apparatus 10 transmits, to the biometric reference information certificate generation apparatus 20, the hash value of the biometric reference information and the biometric authentication context C that have been generated in steps ST7 and ST8 (ST10).

Upon receiving the hash value of the biometric reference information and the biometric authentication context C, the biometric reference information certificate generation apparatus 20 verifies the validity of the biometric authentication context C based on a public key corresponding to the private key of the biometric reference information storage apparatus 10 and the challenge information notified in step ST2 (ST11). More specifically, the biometric authentication context verification unit 23 verifies, based on the challenge information transmitted in step ST2, challenge information extracted from the biometric authentication context C. In addition, the biometric authentication context verification unit 23 verifies the first digital signature in the received biometric authentication context based on the first public key corresponding to the first private key of the biometric reference information storage apparatus 10.

If the result of verification in step ST11 represents validity, the certificate generation unit 24 generates, based on the second private key of the apparatus, the second digital signature for the hash value of the biometric reference information and the biometric authentication context C that have been received. The certificate generation unit 24 generates the biometric reference information certificate RC including the hash value of the biometric reference information, the biometric authentication context C, and the second digital signature (ST12). If the result of verification in step ST11 does not represent validity, the overall processing ends. At this time, the biometric reference information certificate generation apparatus 20 may notify the biometric reference information storage apparatus 10 that the processing has ended owing to a verification failure.

After step ST12, the account management unit 25 stores the generated biometric reference information certificate RC as the value of the attribute of the account of the authentication target person (ST13). Since the type of attribute to be used depends on the account structure of the authentication target person, a concrete attribute is not particularly requested in this embodiment, but is desirably an attribute capable of expressing the biometric reference information certificate RC. The processing may be modified to omit step ST13, and after confirming a success response in step ST21, store the biometric reference information certificate RC as the value of the attribute of the account of the authentication target person. In this modification, the account management unit 25 or the certificate generation unit 24 may store the biometric reference information certificate RC in an arbitrary temporary save area.

In any case, the input/output unit 21 of the biometric reference information certificate generation apparatus 20 transmits the biometric reference information certificate RC generated in step ST12 to the biometric reference information storage apparatus 10 (ST14).

As shown in FIG. 10, the biometric reference information storage apparatus 10 receives the biometric reference information certificate RC (ST15), and the validation determination unit 16 extracts the hash value of the biometric reference information and the biometric authentication context C from the biometric reference information certificate RC (ST16).

The validation determination unit 16 compares and verifies the hash value of the extracted biometric reference information and the hash value of biometric reference information in the validation information temporary save unit 17 (ST17). If these hash values do not match each other as a result of the comparison and verification in step ST17, the overall processing ends. At this time, the biometric reference information storage apparatus 10 may notify the biometric reference information certificate generation apparatus 20 that the processing has ended owing to a verification failure. When only biometric reference information is temporarily saved in the validation information temporary save unit 17, the validation determination unit 16 suffices to generate the hash value of the biometric reference information in this step.

If these hash values match each other as a result of the comparison and verification in step ST17, the validation determination unit 16 compares and verifies the biometric authentication context C extracted in step ST16 and the biometric authentication context C in the validation information temporary save unit 17 (ST18). If the biometric authentication contexts C do not match each other as a result of the comparison and verification in step ST18, the overall processing ends. At this time, the biometric reference information storage apparatus 10 may notify the biometric reference information certificate generation apparatus 20 that the processing has ended owing to a verification failure. Steps ST17 and ST18 may be executed in a reverse order.

If the biometric authentication contexts C match each other as a result of the comparison and verification in step ST18, the validation determination unit 16 stores, in the information storage unit 18, the biometric reference information in the validation information temporary save unit 17 and the biometric reference information certificate RC received in step ST15 (ST19). The validation determination unit 16 validates the biometric reference information certificate RC by saving the biometric reference information certificate RC in the validation information temporary save unit 17 (ST20).

Thereafter, the biometric reference information storage apparatus 10 notifies the biometric reference information certificate generation apparatus 20 of a success response representing the success of all processes (ST21). Note that the success response may include, e.g., at least one of pieces of information (e.g., user ID and biometric reference information certificate RC) associated with the validation flag in the account management unit 25.

Upon receiving the success response, the biometric reference information certificate generation apparatus 20 controls the account management unit 25 to update, e.g., the validation flag associated with information in the success response to be true.

As described above, according to the first embodiment, the biometric reference information certificate generation apparatus 20 transmits challenge information to the biometric reference information storage apparatus 10. The biometric reference information storage apparatus 10 transmits, to the biometric reference information certificate generation apparatus 20, the hash value of biometric reference information, and the biometric authentication context C including the challenge information, the hash value of the biometric reference information, and the first digital signature. The biometric reference information certificate generation apparatus 20 verifies the challenge information, then verifies the first digital signature by using the first public key, and transmits, to the biometric reference information storage apparatus 10, the biometric reference information certificate RC including the biometric authentication context, the hash value of the biometric reference information, and the second digital signature. The biometric reference information storage apparatus 10 verifies the hash value of the biometric reference information and the biometric authentication context C, and stores the biometric reference information and the biometric reference information certificate RC.

In this manner, challenge & response authentication, authentication based on a public key, authentication based on a hash value, and the like are used without using shared secret information. With this arrangement, biometric reference information can be guaranteed and stored through the network Nw without sharing secret information in advance between the device (biometric reference information storage apparatus 10) and the biometric authentication system.

For example, biometric reference information can be guaranteed online for a biometric authentication system selected by an authentication target person using a device selected by the authentication target person, and the biometric reference information can be stored in the device. Therefore, improvement of the user friendliness when registering or updating biometric reference information in the biometric authentication system can be expected.

Since secret information need not be shared in advance between the device and the biometric authentication system, the user need not possess a corresponding device for each biometric authentication system, and the burden of possessing a device can be reduced.

Second Embodiment

FIG. 11 is a schematic view showing an example of the arrangement of a biometric reference information registration system according to the second embodiment. FIGS. 12 and 13 are schematic views showing an example of the arrangements of respective apparatuses in the system. The same reference numerals as those in the above-described drawings denote the same parts, a detailed description thereof will not be repeated, and a difference will be mainly described here.

The first embodiment has explained an arrangement in which the single biometric reference information storage apparatus 10 generates biometric reference information. However, the present invention is not limited to this, and the biometric reference information storage apparatus 10 may be divided into an apparatus including either the biometric information sampling unit 13 or the biometric reference information generation unit 14, or an apparatus including both the biometric information sampling unit 13 and the biometric reference information generation unit 14. FIGS. 11, 12, and 13 show an example of an arrangement in which a biometric information sampling apparatus 10a including a biometric information sampling unit 13, and a biometric reference information storage apparatus 10 including a biometric reference information generation unit 14 are separated.

In this case, biometric authentication context generation units 15a and 15 are arranged in the respective separated apparatuses 10a and 10, and generate biometric authentication contexts C1 and C2, respectively, similarly to the operation described in the first embodiment. It is only necessary to manage the generated biometric authentication contexts C1 and C2 altogether in a validation information temporary save unit 17 of the biometric reference information storage apparatus 10.

Figure 14:
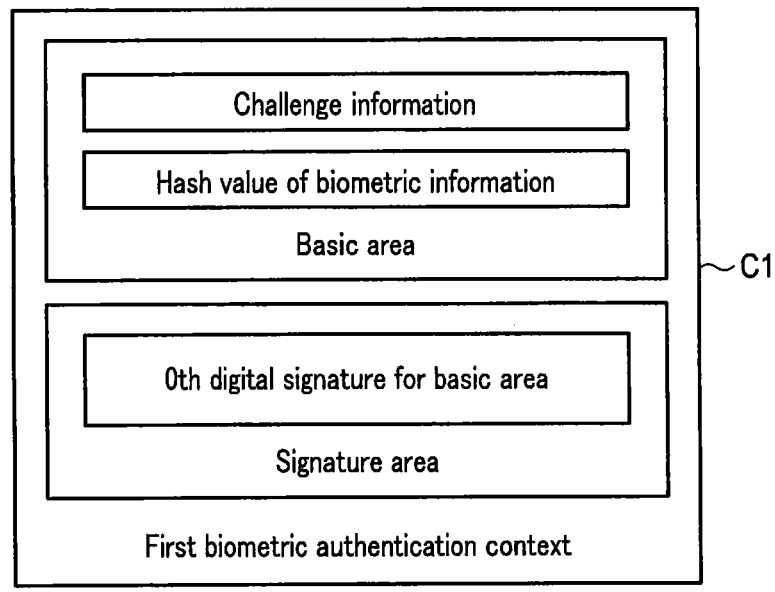
FIG. 14 is a schematic view showing an example of the structure of a first biometric authentication context according to the second embodiment.

Note that the first biometric authentication context C1 is generated by the biometric information sampling apparatus 10a, and includes challenge information, the hash value of biometric information, and the 0th digital signature, as shown in FIG. 14. The 0th digital signature is generated by signature processing on challenge information and the hash value of biometric information based on the 0th private key of the biometric information sampling apparatus 10a.

Figure 15:
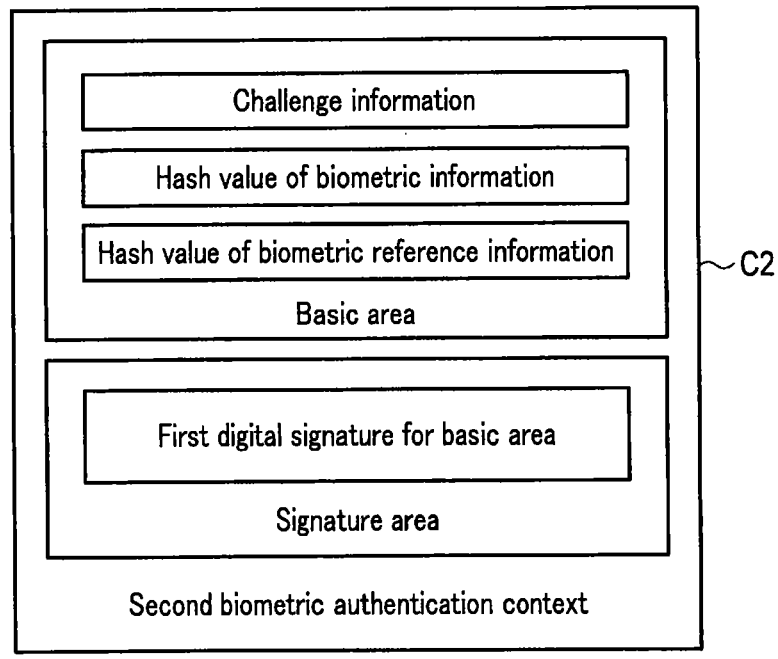
FIG. 15 is a schematic view showing an example of the structure of a second biometric authentication context according to the second embodiment.

The second biometric authentication context C2 is generated by the biometric reference information storage apparatus 10, and includes challenge information, the hash value of biometric information, the hash value of biometric reference information, and the first digital signature, as shown in FIG. 15. The hash value of biometric information is the hash value of biometric information given as an input to the biometric reference information storage apparatus 10. The first digital signature is generated by signature processing on challenge information and the hash value of biometric reference information based on the first private key of the biometric reference information storage apparatus 10.

A biometric reference information certificate RC is generated by a biometric reference information certificate generation apparatus 20, and includes the first biometric authentication context C1, the second biometric authentication context C2, the hash value of biometric reference information, and the second digital signature, as shown in FIG. 16. The second digital signature is generated by signature processing on the first biometric authentication context C1, the second biometric authentication context C2, and the hash value of biometric reference information based on the second private key of the biometric reference information certificate generation apparatus 20.

The two biometric authentication contexts C1 and are C2 are stored in even the biometric authentication context storage area in the validation information temporary save unit 17 shown in FIGS. 4 and 5.

Next, the operation of the biometric reference information registration system having the above-described arrangement will be explained with reference to the sequence chart of FIG. 17.

Assume that steps ST1 to ST3 are executed in the above-described way.

If the biometric reference information storage apparatus 10 receives challenge information from the biometric reference information certificate generation apparatus 20, it transmits the challenge information and a biometric information sampling request to the biometric information sampling apparatus 10*a* (ST4-1).

In the biometric information sampling apparatus 10*a*, an input/output unit 11*a* receives the challenge information and the biometric information sampling request. Then, a control unit 12*a* sends the challenge information to the biometric authentication context generation unit 15*a*, and activates the biometric information sampling unit 13. The biometric information sampling unit 13 samples biometric information of an authentication target person (ST4-2).

The biometric information is sent to the biometric authentication context generation unit 15*a* via the control unit 12*a*. Note that the control unit 12*a* may be omitted, and the respective units 11*a*, 13, and 15*a* may directly transfer information.

The biometric authentication context generation unit 15*a* of the biometric information sampling apparatus 10*a* generates the hash value of the biometric reference information generated in step ST4-2.

The biometric authentication context generation unit 15*a* generates the 0th digital signature based on the 0th private key of the apparatus 10*a* for the challenge information received in step ST4-1 and the generated hash value of the biometric reference information. Also, the biometric authentication context generation unit 15*a* generates the first biometric authentication context C1 including the challenge information, the hash value of the biometric reference information, and the 0th digital signature (ST4-1).

After that, the biometric authentication context generation unit 15*a* transmits the first biometric authentication context C1 and the biometric information sampled in step ST4-2 to the biometric reference information storage apparatus 10 (ST4-4).

The biometric reference information generation unit 14 generates biometric reference information from the biometric information sampled in step ST4-4 (ST5), and temporarily saves the biometric reference information in the validation information temporary save unit 17 (ST6). Also, the biometric reference information generation unit 14 temporarily saves the first biometric authentication context C1 sampled in step ST4-4 in the validation information temporary save unit 17.

Then, the apparatuses 10 and 20 execute the same processes as those in step ST7 and subsequent steps, except that the two biometric authentication contexts C1 and C2 are used.

For example, in steps ST8 and ST9, the biometric authentication context generation unit 15 generates the second biometric authentication context C2 including challenge information, the hash value of biometric reference information, and the first digital signature, and temporarily saves the second biometric authentication context C2 in the validation information temporary save unit 17.

In steps ST8 and ST9, the biometric reference information storage apparatus 10 transmits the hash value of the biometric reference information and the first and second biometric authentication contexts C1 and C2 to the biometric reference information certificate generation apparatus 20.

In step ST11, a biometric authentication context verification unit 23 verifies the validity of the respective biometric authentication contexts C1 and C2 based on the 0th public key corresponding to the 0th private key of the biometric information sampling apparatus 10*a*, the first public key corresponding to the first private key of the biometric reference information storage apparatus 10, and the challenge information notified in step ST2.

More specifically, the biometric authentication context verification unit 23 verifies pieces of challenge information extracted from the respective biometric authentication contexts C1 and C2 based on the challenge information transmitted in step ST2. The biometric authentication context verification unit 23 verifies the 0th digital signature in the received first biometric authentication context C1 based on the 0th public key corresponding to the 0th private key of the biometric information sampling apparatus 10*a*. Similarly, the biometric authentication context verification unit 23 verifies the first digital signature in the received second biometric authentication context C2 based on the first public key corresponding to the first private key of the biometric reference information storage apparatus 10.

In step ST12, when the verification result in step ST11 represents validity, the certificate generation unit 24 generates the second digital signature based on the second private key of the apparatus for the hash value of the biometric reference information and the respective biometric authentication contexts C1 and C2 that have been received. The certificate generation unit 24 generates the biometric reference information certificate RC including the hash value of the biometric reference information, the respective biometric authentication contexts C1 and C2, and the second digital signature.

In step ST16, the validation determination unit 16 extracts the hash value of the biometric reference information and the respective biometric authentication contexts C1 and C2 from the biometric reference information certificate RC.

In step ST18, the validation determination unit 16 compares and verifies the first biometric authentication context C1 extracted in step ST16, and the first biometric authentication context C1 in the validation information temporary save unit 17. Similarly, the validation determination unit 16 compares and verifies the second biometric authentication context C2 extracted in step ST16, and the second biometric authentication context C2 in the validation information temporary save unit 17.

Thereafter, processes in step ST19 and subsequent steps are executed in the above-described way.

As described above, according to the second embodiment, even when the biometric information sampling unit 13 is separated from the biometric reference information storage apparatus 10 in the first embodiment, the same effects as those in the first embodiment can be obtained.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A biometric reference information registration system comprising a biometric reference information storage apparatus and biometric reference information certificate generation apparatus configured to communicate with each other through a network, the biometric reference information registration system registering biometric reference information of an authentication target person in the biometric reference information storage apparatus, the biometric reference information storage apparatus including:

a first private key storage module configured to store a first private key of the apparatus;

a validation information temporary save memory that temporarily saves biometric reference information, a hash value of the biometric reference information, a biometric authentication context, and a biometric reference information certificate in association with each other, the biometric reference information certificate being a valid biometric reference information certificate;

a challenge information reception module configured to receive challenge information from the biometric reference information certificate generation apparatus;

a biometric reference information generation module configured to generate biometric reference information based on biometric information sampled from the authentication target person and temporarily save the biometric reference information in the validation information temporary save memory;

a hash value generation module configured to generate a hash value of the biometric reference information and temporarily save the hash value in the validation information temporary save memory;

a first signature generation module configured to generate a first digital signature based on the first private key for the challenge information and the hash value of the biometric reference information;

a biometric authentication context generation module configured to generate a biometric authentication context including the challenge information, the hash value of the biometric reference information, and the first digital signature, and temporarily save the biometric authentication context in the validation information temporary save memory;

a biometric authentication context transmission module configured to transmit the hash value of the biometric reference information and the biometric authentication context to the biometric reference information certificate generation apparatus;

a certificate reception module configured to receive, from the biometric reference information certificate generation apparatus, a biometric reference information certificate including the hash value of the biometric reference information, the biometric authentication context, and a second digital signature for the hash value of the biometric reference information and the biometric authentication context;

a first extraction module configured to extract the hash value of the biometric reference information and the biometric authentication context from the biometric reference information certificate;

a hash value verification module configured to verify the extracted hash value based on the hash value of biometric reference information in the validation information temporary save memory;

a biometric authentication context verification module configured to verify the extracted biometric authentication context based on the biometric authentication context in the validation information temporary save memory;

a storage module configured to store the biometric reference information and the biometric reference information certificate;

a write module configured to, when respective results of the verifications by the hash value verification module and the biometric authentication context verification module represent validity, write the biometric reference information and the biometric reference information certificate in the storage module, and validate the biometric reference information certificate by saving the biometric reference information certificate in the validation information temporary save memory; and a notification module which notifies the biometric reference information certificate generation apparatus of a success response after validation of the biometric reference information certificate, wherein the success response includes information including at least one of a user ID and the biometric reference information certificate, the biometric reference information certificate generation apparatus including:

an account storage module configured to store a user ID of the authentication target person, the biometric reference information certificate, and a validation flag in association with each other;

a second private key storage module configured to store a second private key of the apparatus;

a challenge information transmission module configured to generate the challenge information and transmitting the challenge information to the biometric reference information storage apparatus;

a biometric authentication context reception module configured to receive the hash value of the biometric reference information and the biometric authentication context from the biometric reference information storage apparatus;

a second extraction module configured to extract challenge information from the received biometric authentication context;

a challenge information verification module configured to verify the extracted challenge information based on the transmitted challenge information;

a signature verification module configured to verify a first digital signature in the received biometric authentication context based on a first public key corresponding to the first private key;

a second signature generation module configured to, when respective results of the verifications by the challenge information verification module and the signature verification module represent validity, generate the second digital signature based on the second private key for the hash value of the biometric reference information and the biometric authentication context that have been received;

a certificate generation module configured to generate the biometric reference information certificate including the hash value of the biometric reference information, the biometric authentication context, and the second digital signature;

a certificate write module configured to write the generated biometric reference information certificate in the account storage module in association with the user ID of the authentication target person;

a certificate transmission module configured to transmit the generated biometric reference information certificate to the biometric reference information storage apparatus; and an updating module configured to, upon receiving the success response, update the validation flag in the account storage module, based on the information in the success response, to be true.

2. A biometric reference information storage apparatus configured to communicate with a biometric reference information certificate generation apparatus through a network, comprising:

a first private key storage module configured to store a first private key of the apparatus;

a validation information temporary save memory that temporarily saves biometric reference information, a hash value of the biometric reference information, a biometric authentication context, and a biometric reference information certificate in association with each other, the biometric reference information certificate being a valid biometric reference information certificate;

a challenge information reception module configured to receive challenge information from the biometric reference information certificate generation apparatus;

a biometric reference information generation module configured to generate biometric reference information based on biometric information sampled from the authentication target person, and temporarily save the biometric reference information in the validation information temporary save memory;

a hash value generation module configured to generate a hash value of the biometric reference information, and temporarily save the hash value in the validation information temporary save memory;

a first signature generation module configured to generate a first digital signature based on the first private key for the challenge information and the hash value of the biometric reference information;

a biometric authentication context generation module configured to generate a biometric authentication context including the challenge information, the hash value of the biometric reference information, and the first digital signature, and temporarily save the biometric authentication context in the validation information temporary save memory;

a biometric authentication context transmission module configured to transmit the hash value of the biometric reference information and the biometric authentication context to the biometric reference information certificate generation apparatus;

a certificate reception module configured to receive, from the biometric reference information certificate generation apparatus, a biometric reference information certificate including the hash value of the biometric reference information, the biometric authentication context, and a second digital signature for the hash value of the biometric reference information and the biometric authentication context;

a first extraction module configured to extract the hash value of the biometric reference information and the biometric authentication context from the biometric reference information certificate;

a hash value verification module configured to verify the extracted hash value based on the hash value of biometric reference information in the validation information temporary save memory;

a biometric authentication context verification module configured to verify the extracted biometric authentication context based on the biometric authentication context in the validation information temporary save memory;

a storage module configured to store the biometric reference information and the biometric reference information certificate;

a write module configured to, when respective results of the verifications by the hash value verification module and the biometric authentication context verification module represent validity, write the biometric reference information and the biometric reference information certificate in the storage module, and validate the biometric reference information certificate by saving the biometric reference information certificate in the validation information temporary save memory; and a notification module which notifies the biometric reference information certificate generation apparatus of a success response after validation of the biometric reference information certificate, wherein the success response includes information including at least one of a user ID and the biometric reference information certificate, wherein the biometric reference information certificate generation apparatus transmits the challenge information to the biometric reference information storage apparatus, receives the hash value of the biometric reference information and the biometric authentication context from the biometric reference information storage apparatus, extracts challenge information from the biometric authentication context, verifies the extracted challenge information based on the transmitted challenge information, verifies a first digital signature in the biometric authentication context based on a first public key corresponding to the first private key, when respective results of the verifications represent validity, generates the second digital signature based on a second private key of the apparatus, generates the biometric reference information certificate including the hash value of the biometric reference information, the biometric authentication context, and the second digital signature, transmits the biometric reference information certificate to the biometric reference information storage apparatus, an updating module configured to, upon receiving the success response, update the validation flag in the account storage module, based on the information in the success response, to be true.

3. A biometric reference information certificate generation apparatus configured to communicate with a biometric reference information storage apparatus through a network, the biometric reference information storage apparatus including a validation information temporary save memory that temporarily saves biometric reference information, a hash value of the biometric reference information, a biometric authentication context, and a biometric reference information certificate in association with each other, the biometric reference information certificate being a valid biometric reference information certificate, the biometric reference information certificate generation apparatus comprising:

an account storage module configured to store a user ID of an authentication target person, a biometric reference information certificate, and a validation flag in association with each other;

a second private key storage module configured to store a second private key of the apparatus;

a challenge information transmission module configured to generate challenge information and transmit the challenge information to the biometric reference information storage apparatus;

a biometric authentication context reception module configured to, when the biometric reference information storage apparatus generates biometric reference information based on biometric information sampled from the authentication target person and temporarily saves the biometric reference information in the validation information temporary save memory, generates a hash value of the biometric reference information and temporarily saves the hash value in the validation information temporary save memory, generates a first digital signature based on a first private key of the apparatus for the challenge information and the hash value of the biometric reference information, generates a biometric authentication context including the challenge information, the hash value of the biometric reference information, and the first digital signature, and temporarily saves the biometric authentication context in the validation information temporary save memory, and transmits the hash value of the biometric reference information and the biometric authentication context to the biometric reference information certificate generation apparatus, receiving the hash value of the biometric reference information and the biometric authentication context from the biometric reference information storage apparatus;

a second extraction module configured to extract challenge information from the received biometric authentication context;

a challenge information verification module configured to verify the extracted challenge information based on the transmitted challenge information;

a signature verification module configured to verify a first digital signature in the received biometric authentication context based on a first public key corresponding to the first private key;

a second signature generation module configured to, when respective results of the verifications by the challenge information verification module and the signature verification module represent validity, generate the second digital signature based on the second private key for the hash value of the biometric reference information and the biometric authentication context that have been received;

a certificate generation module configured to generate the biometric reference information certificate including the hash value of the biometric reference information, the biometric authentication context, and the second digital signature;

a certificate write module configured to write the generated biometric reference information certificate in the account storage module in association with the user ID of the authentication target person;

a certificate transmission module configured to transmit the generated biometric reference information certificate to the biometric reference information storage apparatus; and an updating module configured to, upon receiving the success response, update the validation flag in the account storage module, based on the information in the success response, to be true, wherein the biometric reference information storage apparatus receives the biometric reference information certificate from the biometric reference information certificate generation apparatus, extracts a hash value of the biometric reference information and the biometric authentication context from the biometric reference information certificate, verifies the extracted hash value based on the hash value of biometric reference information in the validation information temporary save memory, verifies the extracted biometric authentication context based on the biometric authentication context in the validation information temporary save memory, when respective results of the verifications represent validity, writes the biometric reference information and the biometric reference information certificate in a storage module and validates the biometric reference information certificate by saving the biometric reference information certificate in the validation information temporary save memory, and notifies the biometric reference information certificate generation apparatus of a success response after validation of the biometric reference information certificate, wherein the success response includes information including at least one of a user ID and the biometric reference information certificate.

4. A non-transitory computer-readable storage medium storing a program, the program being used for a biometric reference information storage apparatus configured to communicate with a biometric reference information certificate generation apparatus through a network, the biometric reference information storage apparatus including a first private key storage module and a storage module, the program causing the biometric reference information storage apparatus to execute a storage method, the storage method comprising:

writing a first private key of the apparatus in the first private key storage module;

temporarily saving, in a validation information temporary save memory, biometric reference information, a hash value of the biometric reference information, a biometric authentication context, and a biometric reference information certificate in association with each other, the biometric reference information certificate being a valid biometric reference information certificate;

receiving challenge information from the biometric reference information certificate generation apparatus;

generating biometric reference information based on biometric information sampled from an authentication target person and temporarily saving the biometric reference information in the validation information temporary save memory;

generating a hash value of the biometric reference information and temporarily saving the hash value in the validation information temporary save memory;

generating a first digital signature based on the first private key for the challenge information and the hash value of the biometric reference information;

generating a biometric authentication context including the challenge information, the hash value of the biometric reference information, and the first digital signature and temporarily saving the biometric authentication context in the validation information temporary save memory;

transmitting the hash value of the biometric reference information and the biometric authentication context to the biometric reference information certificate generation apparatus;

receiving, from the biometric reference information certificate generation apparatus, a biometric reference information certificate including the hash value of the biometric reference information, the biometric authentication context, and a second digital signature for the hash value of the biometric reference information and the biometric authentication context;

extracting the hash value of the biometric reference information and the biometric authentication context from the biometric reference information certificate;

verifying the extracted hash value based on the hash value of biometric reference information in the validation information temporary save memory;

verifying the extracted biometric authentication context based on the biometric authentication context in the validation information temporary save memory;

when respective results of the verifications represent validity, writing the biometric reference information and the biometric reference information certificate in the storage module, and validating the biometric reference information certificate by saving the biometric reference information certificate in the validation information temporary save memory; and notifying the biometric reference information certificate generation apparatus of a success response after validation of the biometric reference information certificate, wherein the success response includes information including at least one of a user ID and the biometric reference information certificate, wherein the biometric reference information certificate generation apparatus transmits the challenge information to the biometric reference information storage apparatus, receives the hash value of the biometric reference information and the biometric authentication context from the biometric reference information storage apparatus, extracts challenge information from the biometric authentication context, verifies the extracted challenge information based on the transmitted challenge information, verifies a first digital signature in the biometric authentication context based on a first public key corresponding to the first private key, when the respective results of the verifications represent validity, generates the second digital signature based on a second private key of the apparatus, generates the biometric reference information certificate including the hash value of the biometric reference information, the biometric authentication context, and the second digital signature, transmits the biometric reference information certificate to the biometric reference information storage apparatus, and upon receiving the success response, updates the validation flag in the account storage module, based on the information in the success response, to be true.

5. A non-transitory computer-readable storage medium storing a program, the program being used for a biometric reference information certificate generation apparatus configured to communicate with a biometric reference information storage apparatus through a network, the biometric reference information storage apparatus including a validation information temporary save memory that temporarily saves biometric reference information, a hash value of the biometric reference information, a biometric authentication context, and a biometric reference information certificate in association with each other, the biometric reference information certificate being a valid biometric reference information certificate, the biometric reference information certificate generation apparatus including an account storage module and a second private key storage module, the program causing the biometric reference information certificate generation apparatus to execute a generation method, the generation method comprising:

writing a user ID of an authentication target person, a biometric reference information certificate, and a validation flag in association with each other in the account storage module;

writing a second private key of the apparatus in the second private key storage module;

generating challenge information and transmitting the challenge information to the biometric reference information storage apparatus;

when the biometric reference information storage apparatus generates biometric reference information based on biometric information sampled from the authentication target person and temporarily saves the biometric reference information in the validation information temporary save memory, generates a hash value of the biometric reference information and temporarily saves the hash value in the validation information temporary save memory, generates a first digital signature based on a first private key of the apparatus for the challenge information and the hash value of the biometric reference information, generates a biometric authentication context including the challenge information, the hash value of the biometric reference information, and the first digital signature, and temporarily saves the biometric authentication context in the validation information temporary save memory, and transmits the hash value of the biometric reference information and the biometric authentication context to the biometric reference information certificate generation apparatus, receiving the hash value of the biometric reference information and the biometric authentication context from the biometric reference information storage apparatus;

extracting challenge information from the received biometric authentication context;

verifying the extracted challenge information based on the transmitted challenge information;

verifying a first digital signature in the received biometric authentication context based on a first public key corresponding to the first private key;

when respective results of the verifications of the extracted challenge information and the first digital signature represent validity, generating the second digital signature based on the second private key for the hash value of the biometric reference information and the biometric authentication context that have been received;

generating the biometric reference information certificate including the hash value of the biometric reference information, the biometric authentication context, and the second digital signature;

writing the generated biometric reference information certificate in the account storage module in association with the user ID of the authentication target person;

transmitting the generated biometric reference information certificate to the biometric reference information storage apparatus; and upon receiving the success response, updating the validation flag in the account storage module, based on the information in the success response, to be true, wherein the biometric reference information storage apparatus receives the biometric reference information certificate from the biometric reference information certificate generation apparatus, extracts a hash value of the biometric reference information and the biometric authentication context from the biometric reference information certificate, verifies the extracted hash value based on the hash value of biometric reference information in the validation information temporary save memory, verifies the extracted biometric authentication context based on the biometric authentication context in the validation information temporary save memory, when respective results of the verifications represent validity, writes the biometric reference information and the biometric reference information certificate in a storage module, and validates the biometric reference information certificate by saving the biometric reference information certificate in the validation information temporary save memory, and notifies the biometric reference information certificate generation apparatus of a success response after validation of the biometric reference information certificate, wherein the success response includes information including at least one of a user ID and the biometric reference information certificate.

* * * * *